US012656964B2

(12) United States Patent
Lintz et al.

(10) Patent No.: US 12,656,964 B2
(45) Date of Patent: *Jun. 16, 2026

(54) METHOD AND SYSTEM FOR EFFICIENT LAYOUT OF STORED VIDEO SEGMENTS

(71) Applicant: Comcast Cable Communications, LLC, Philadelphia, PA (US)

(72) Inventors: Christopher Lintz, Denver, CO (US); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,064

(22) Filed: May 22, 2024

(65) Prior Publication Data

US 2024/0393967 A1      Nov. 28, 2024

Related U.S. Application Data

(63) Continuation of application No. 17/559,618, filed on Dec. 22, 2021, now Pat. No. 12,026,378.

(51) Int. Cl.
　　*G06F 3/06*　　　(2006.01)
　　*G06F 12/02*　　　(2006.01)
(52) U.S. Cl.
　　CPC .......... *G06F 3/0631* (2013.01); *G06F 3/0604* (2013.01); *G06F 3/067* (2013.01); *G06F 12/0238* (2013.01); *G06F 2212/202* (2013.01)
(58) Field of Classification Search
　　CPC ...... G06F 3/0631; G06F 3/0604; G06F 3/067; G06F 12/0238; G06F 2212/202
　　See application file for complete search history.

(56) References Cited

U.S. PATENT DOCUMENTS

| | | | |
|---|---|---|---|
| 9,699,236 B2 * | 7/2017 | Gopalakrishnan | .... H04L 65/612 |
| 11,321,172 B1 | 5/2022 | Gray et al. | |
| 2015/0324379 A1 | 11/2015 | Danovitz et al. | |
| 2016/0219320 A1 * | 7/2016 | Hain | ................. H04N 21/2543 |
| 2021/0389883 A1 * | 12/2021 | Derryberry | ......... G06F 11/2094 |

FOREIGN PATENT DOCUMENTS

| | | | |
|---|---|---|---|
| CN | 111177104 A | 5/2020 | |
| EP | 3140994 A1 * | 3/2017 | ........... G06F 16/125 |

OTHER PUBLICATIONS

US Patent Application filed on Dec. 22, 2021, entitled "Method and System for Efficient Layout of Stored Video Segments", U.S. Appl. No. 17/559,618.

* cited by examiner

*Primary Examiner* — Masud K Khan
(74) *Attorney, Agent, or Firm* — BakerHostetler

(57) ABSTRACT

Systems and methods are described herein for an efficient storage layout of recorded content associated with a particular user. Content segments, unique to the user and encoded/transcoded at different bit rates, may be stored/partitioned based on the likelihood of a particular bit rate version of content being requested by the user and a duration of playback for the content segment. Content that is more frequently requested may be concatenated in a single storage location on more high performance hardware. Further, content that is played back for a longer duration of playback may also be grouped together and stored on more high performance hardware. Content that is more likely to be played for only a short time may be stored within a plurality of storage containers.

20 Claims, 6 Drawing Sheets

300

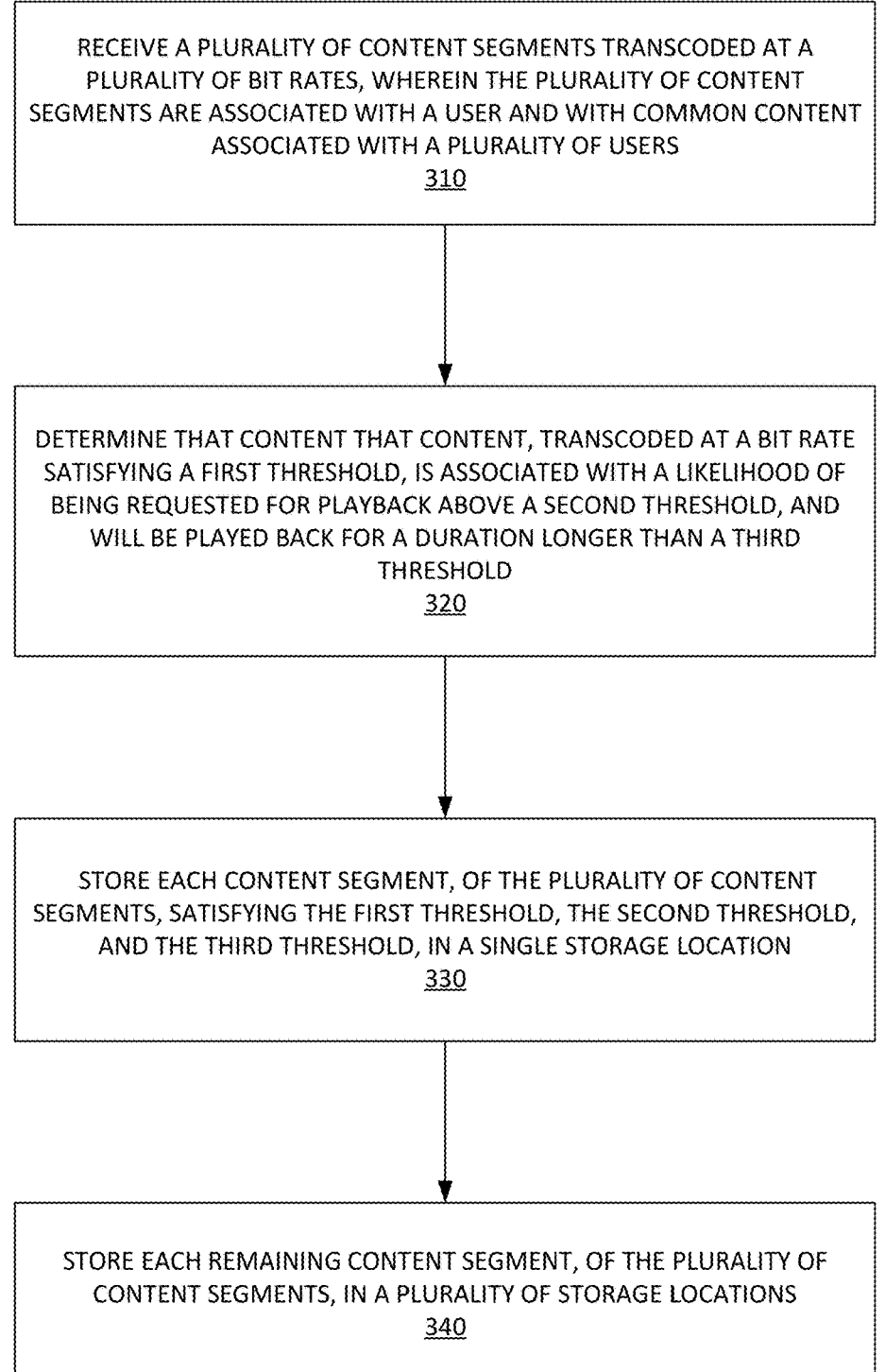

RECEIVE A PLURALITY OF CONTENT SEGMENTS TRANSCODED AT A
PLURALITY OF BIT RATES, WHEREIN THE PLURALITY OF CONTENT
SEGMENTS ARE ASSOCIATED WITH A USER AND WITH COMMON CONTENT
ASSOCIATED WITH A PLURALITY OF USERS
310

DETERMINE THAT CONTENT THAT CONTENT, TRANSCODED AT A BIT RATE
SATISFYING A FIRST THRESHOLD, IS ASSOCIATED WITH A LIKELIHOOD OF
BEING REQUESTED FOR PLAYBACK ABOVE A SECOND THRESHOLD, AND
WILL BE PLAYED BACK FOR A DURATION LONGER THAN A THIRD
THRESHOLD
320

STORE EACH CONTENT SEGMENT, OF THE PLURALITY OF CONTENT
SEGMENTS, SATISFYING THE FIRST THRESHOLD, THE SECOND THRESHOLD,
AND THE THIRD THRESHOLD, IN A SINGLE STORAGE LOCATION
330

STORE EACH REMAINING CONTENT SEGMENT, OF THE PLURALITY OF
CONTENT SEGMENTS, IN A PLURALITY OF STORAGE LOCATIONS
340

FIG. 3

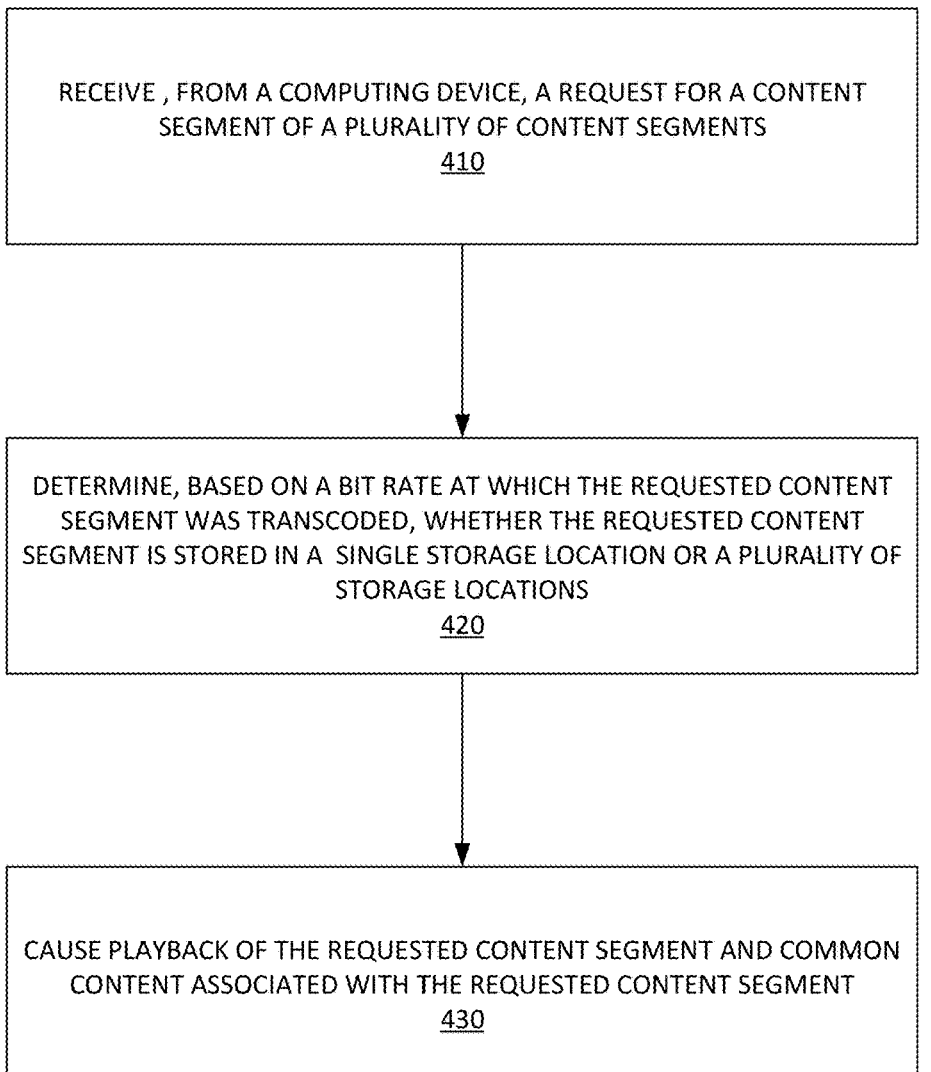

400

RECEIVE , FROM A COMPUTING DEVICE, A REQUEST FOR A CONTENT
SEGMENT OF A PLURALITY OF CONTENT SEGMENTS
410

DETERMINE, BASED ON A BIT RATE AT WHICH THE REQUESTED CONTENT
SEGMENT WAS TRANSCODED, WHETHER THE REQUESTED CONTENT
SEGMENT IS STORED IN A  SINGLE STORAGE LOCATION OR A PLURALITY OF
STORAGE LOCATIONS
420

CAUSE PLAYBACK OF THE REQUESTED CONTENT SEGMENT AND COMMON
CONTENT ASSOCIATED WITH THE REQUESTED CONTENT SEGMENT
430

FIG. 4

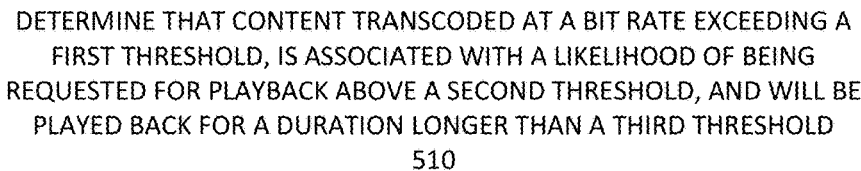

500

DETERMINE THAT CONTENT TRANSCODED AT A BIT RATE EXCEEDING A FIRST THRESHOLD, IS ASSOCIATED WITH A LIKELIHOOD OF BEING REQUESTED FOR PLAYBACK ABOVE A SECOND THRESHOLD, AND WILL BE PLAYED BACK FOR A DURATION LONGER THAN A THIRD THRESHOLD
510

STORE EACH CONTENT SEGMENT, OF A PLURALITY OF CONTENT SEGMENTS, SATISFYING THE FIRST THRESHOLD, THE SECOND THRESHOLD, AND THE THIRD THRESHOLD, IN A SINGLE STORAGE LOCATION, WHEREIN THE PLURALITY OF CONTENT SEGMENTS ARE ASSOCIATED WITH A USER AND WITH COMMON CONTENT ASSOCIATED WITH A PLURALITY OF USERS
520

STORE EACH REMAINING CONTENT SEGMENT, OF THE PLURALITY OF CONTENT SEGMENTS, IN A PLURALITY OF STORAGE LOCATIONS
530

FIG. 5

METHOD AND SYSTEM FOR EFFICIENT LAYOUT OF STORED VIDEO SEGMENTS

CROSS-REFERENCE TO RELATED APPLICATIONS

This application is a continuation of U.S. patent application Ser. No. 17/559,618, filed Dec. 22, 2021, now U.S. Pat. No. 12,026,378, issued on Jul. 2, 2024, which is hereby incorporated by reference in its entirety.

BACKGROUND

Many service providers (e.g., a cable service provider) offer cloud or network storage for content recording. For example, in a cloud or network digital video recorder (DVR) system, content may be recorded or stored on the provider's servers for the requesting user. Accordingly, there is a need for more efficient techniques for, writing, accessing, storing, and/or delivering content stored in the cloud.

SUMMARY

Systems and methods are described herein for an efficient storage layout of recorded content associated with a particular user. Content segments, unique to the user and encoded/transcoded at different bit rates, may be stored/partitioned based on the likelihood of a particular bit rate version of content being requested by the user and a duration of playback for the content segment. Content that is more frequently requested may be concatenated in a single storage location on more high performance hardware. Further, content that is played back for a longer duration of playback may also be grouped together and stored on more high performance hardware. Content that is more likely to be played for only a short time may be stored within a plurality of storage containers. A manifest may be generated that indicates the location for the stored content segments and the common content common to all users so that a computing device of the user may request content for playback.

BRIEF DESCRIPTION OF THE DRAWINGS

The following drawings show generally, by way of example, but not by way of limitation, various examples discussed in the present disclosure. In the drawings:
FIG. 3 shows an example method;
FIG. 4 shows an example method;
FIG. 5 shows an example method.

DETAILED DESCRIPTION OF ILLUSTRATIVE EMBODIMENTS

Systems and methods are described herein for processing content and for storing content. The systems and methods described herein provide an efficient storage layout of content segments (e.g., video segments) that were encoded/transcoded at different bit rates. The content segments may be stored based on an anticipated duration of playback of those segments. For example, recorded content segments may be stored/partitioned based on the likelihood of a particular bit rate version of content being requested by a user more frequently and for a longer duration of playback as compared with other bit rate versions of the content. The more likely content at a particular bit rate is to be played for a short time, the more spread out those segments are stored within a storage container. Content associated with a longer predicted playout may be stored together as compared with other bit rates. The storage/partitioning may be based on content type, e.g., advertisement or main content. Advertisements, although associated with a shorter duration than main content, may be stored together.

Figure 1:
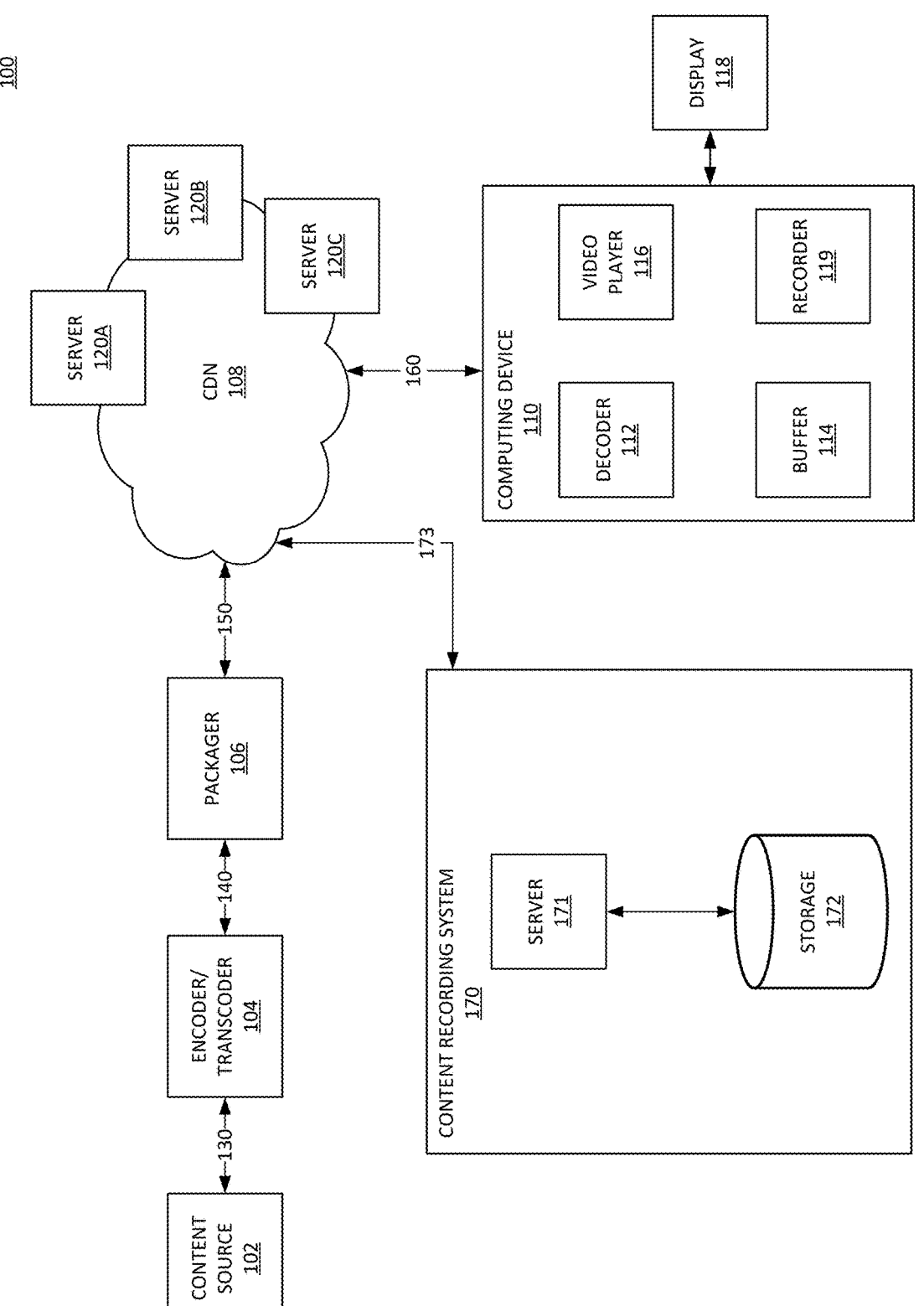
FIG. 1 shows an example system.

FIG. 1 shows system 100 for delivering content. The example system 100 may comprise a content source 102, an encoder/transcoder 104, a packager 106, a content delivery network (CDN) 108, and a computing device 110. The techniques for video processing described herein are applicable to any content delivery method including but not limited to Dynamic Adaptive Streaming over HTTP (DASH), HTTP Live Streaming (HLS), the quadrature amplitude modulation (QAM) standard, and/or adaptive bit rate (ABR) streaming The computing device 110 may comprise a television, a monitor, a laptop, a desktop, a smart phone, a set-top box, a streaming-video player, a cable modem, a gateway, a tablet, a wearable computing device, a mobile computing device, any computing device configured to receive and/or render content, the like, and/or any combination of the foregoing. The computing device 110 may comprise a decoder 112, a buffer 114, a video player 116, and a digital video recorder (DVR) 119. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, the DVR 119, and the display 118 may be realized in a single device, such as a laptop or mobile device. The decoder 112 may decompress/decode encoded video data. The encoded video data may be received from the encoder/transcoder 104, the packager 106, or the CDN 108.

The content source 102 may comprise a source feed of content from a provider. For example, the content source 102 may comprise a broadcast source, a service provider (e.g., a cable television service provider), a headend, a video on-demand server, a cable modem termination system, the like, and/or any combination of the foregoing. The content source 102 may send content 130 to the encoder/transcoder 104. The content 130 may comprise for example, a program, a television show, a movie, a sports event broadcast, or the like. The content 130 may comprise video frames or other images. For example, the content 130 may comprise video frames in a Moving Picture Experts Group (MPEG) Single Program Transport Stream (MPEG-SPTS). The video frames may comprise pixels. A pixel may comprise the smallest controllable element of a video frame. The video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel.

The content source 102 may receive requests for the content 130 from the encoder/transcoder 104, the packager 106, the computing device 110, or the CDN 108. The content source 102 may send content 130 to the encoder/transcoder 104 based on a request for video from the encoder/transcoder 104, the packager 106, the computing device 110, or the CDN 108. The content 130 may comprise uncompressed video data or a content stream such as an MPEG-SPTS.

The encoder/transcoder 104 may comprise an encoder, which may encode uncompressed video data received from the content source 102. The terms transcoder and encoder may be used interchangeably herein. The terms transcode and encode may be used interchangeably herein. The encoder/transcoder 104 may receive content from the content source 102. The content may be in any one of a variety of formats, such as, for example, H.264, MPEG-4 Part 2, or MPEG-2. The encoder/transcoder 104 may convert the content from one video format to another video format, such as one format compatible with the playback devices of the service provider's users (e.g., computing device 110). The encoder/transcoder 104 may additionally segment the content into a plurality of segments. For example, content may be segmented into a series of 2-second segments.

When uncompressed video data is received, the encoder may encode the video (e.g., into a compressed format) using a compression technique prior to transmission. The content source 102 and the encoder/transcoder 104 may be co-located at a premises, located at separate premises, or associated with separate instances in the cloud. The encoder 104 may comprise any type of encoder including but not limited to: H.264/MPEG-AVC, H.265/MPEG-HEVC, MPEG-5 EVC, H.266/MPEG-VVC, AV1, VP9, Global motion compensation (GMC), etc. The encoder/transcoder 104 may transcode the content 130 into one or more output streams 140. The one or more output streams 140 may comprise video encoded with different resolutions and/or different bit rates.

The packager 106 may receive the content from the encoder/transcoder 104 or the content recording system 170. For example, the packager 106 may receive the one or more output streams 140 from the encoder/transcoder 104. The packager 106 may determine how the content is to be segmented and put together for delivery to and eventual playback by the computing device 110. As part of this process, the packager 106 may segment the content (such as in the event that the content has not yet been segmented) or may re-segment the content (such as in the event that the content had been previously segmented). The packager 106 may additionally insert one or more cues or markers into the content segments at which one or more additional segments, such as segments comprising an advertisement, may be inserted by an upstream client, server, or logical module, such as the computing device 132 or the server 171.

The packager 106 may create a manifest file associated with the content. For example, the manifest may comprise a DASH manifest. The manifest may comprise information describing various aspects of the associated content that may be useful for the computing device 110 to playback the content and/or for the content recording system 170 to store and retrieve the content. For example, the manifest may indicate the availability of the segments comprising the content, the length of each segment, the number of segments, and/or the proper ordering of the segments necessary to cause playback of the content. The manifest may further include a network location (e.g., a hyper-text transfer protocol (HTTP) uniform resource locater (URL) link or other universal resource identifier (URI)) for each segment from which the segment may be downloaded, accessed, or retrieved. For example, the network location may indicate a location in storage 172.

The network locations included within the manifest may indicate more than one location or source. For example, the network location for segments corresponding to the content may reference a storage location while the network location for segments corresponding to an inserted advertisement may reference a location from outside the system 100 (e.g., at an advertising server). The manifest may describe multiple versions (e.g., different quality levels) of the content, including corresponding information on those segments. For example, manifest may describe multiple bit rate and/or resolution versions of the content. The manifest may be provided, such as by the server 171, to the computing device 110 in response to a request to receive stored content. The computing device 110 may use the manifest file to determine the segments required to play the content or a segment/portion of the content and subsequently download the required segments using the network locations specified in the manifest file.

The packager 106 may generate one or more ABR streams 150 in different ABR streaming formats. The one or more ABR streams 150 may comprise segments or fragments of video and the manifest. The manifest may indicate availability of the ABR stream and segments/fragments and information for requesting the segments/fragments (e.g., via a URL). The packager 106 may send the one or more ABR streams 150 to the CDN 108.

The CDN 108 may comprise one or more computing devices such as servers 120A, 120B, 120C that store content (e.g., the one or more ABR streams 150). The CDN 108 may receive a request for content from the computing device 110. The request may be sent via HTTP. The CDN 108 may authorize/authenticate the request and/or the computing device 110 from which the request originated. The request for content may comprise a request for a channel, a recorded program, a video on-demand asset, a website address, a video asset associated with a streaming service, the like, and/or any combination of the foregoing. The CDN 108 may send the request to the content source 102, the encoder/transcoder 104, or the packager 106. The CDN 108 may send the requested content 160 to the computing device 110. The one or more servers 120A, 120B, 120C of the CDN 108 may serve the content 160 to the computing device 110.

The CDN 108 may group stored content segments during based on the anticipated duration of playback of those segments and/or the likelihood of a particular bit rate version of content being requested by the computing device 110. For example, the CDN 108 may store content that is requested more frequently and for a longer duration of playback together in a single storage container as compared with other bit rate versions of the content. The CDN 108 may store content that is more likely to be played for a short time in one or more storage containers.

The system 100 may comprise the content recording system 170 such as a cloud or DVR system, by which the content source 102 may receive a request to record content 173, store the recorded content 173, and potentially fulfill a request to deliver the recorded content 173 for playback. The request to record content may be received from the computing device 110, and the requested content may be delivered to the computing device 110 for playback. The content recording system 170 may include server 171. The server 171 may receive and fulfill a request from the computing device 110 to deliver recorded content to the computing device 110 for playback. The request from the computing device 110 to deliver the recorded content may include identifications of the user (e.g., an account identifier, a username and/or a password), the computing device 110, the requested content, and/or a playback time point or temporal location (e.g., the start of a program or the 12:30 mark in a 30:00 program). The request to deliver the content may indicate a user requesting to skip to a particular portion of content of which the initial segments of the content have already been delivered and are being played on the computing device 110. For example, a user may have started viewing the first minute of content and may then decide to skip to a midway point of the content. In this case, the request to deliver the content would indicate that the computing device 110 is requesting the segments of the content from that midway point and after.

Upon receiving a request to deliver stored content to the computing device 110, the server 171 may provide one or more manifest files to the computing device 110 that describe the content and segments thereof, including network locations from which each segment may be downloaded. Using the manifest file, the computing device 110 may download the segments comprising the content. As the computing device 110 downloads sufficient segments of the content, the computing device 132 may begin playback of the content.

The stored content or portions thereof may be stored in the storage 172, which may be accessed by the computing device 110 directly or indirectly via the server 171 to deliver the stored content to the computing device 110. The storage of the content or portions thereof may occur after the packager 106 processes the content. The storage 172 may comprise cloud object storage and/or one or more data storage devices, such as volatile memory (e.g., one or more of random access memory (RAM)), a hard disk drive, a network-attached storage (NAS), a storage area network (SAN), a serial advanced technology attachment (SATA) drive, a solid state drive (SSD), or a non-volatile memory express (NVMe) drive upon which the content or portions thereof may be stored.

The content recording system 170 may group the content segments during storage within the storage 172 based on the anticipated duration of playback of those segments and/or the likelihood of a particular bit rate version of content being requested by the computing device 110. For example, the content recording system 170 may store recorded content that is requested more frequently and for a longer duration of playback together in a single storage container as compared with other bit rate versions of the content. The content recording system 170 may store recorded content that is more likely to be played for a short time in one or more storage containers.

The stored content segments may comprise user-specific content segments and common segments. The user-specific content segments may small portions of a bitstream associated with the content. For example, a user-specific content segment may comprise a portion of content (e.g., a 2-second chunk of content). The user-specific content segments may be limited to a user account. The common content may comprise the remaining concatenated portions of the bitstream and may be accessible by a plurality of users (e.g., by a plurality of user accounts). The content (e.g., a recorded channel or program) may be stored as a single common portion (e.g., comprising a plurality of common segments) and corresponding user-specific portions (e.g., for each user storing the content). The common portions are unplayable without the user-specific portions. For example, a unique recording may be associated with, for example, a recording requested by the computing device 110. The representation of the unique recording may comprise a portion (e.g., 1%) of the total recorded content segment and may be associated with a profile of the user associated with the computing device 110. The common portion may comprise the remaining portion (e.g., 99%) and be common to multiple computing devices. For example, the computing device 110 may request to record a particular program that is also being recorded for other computing devices.

A user-specific content segment grouping may comprise a storage container that comprises a header and multiple concatenated user-specific content segments for a representation of a unique recording. The multiple groups of user-specific content segments may be associated with content encoded/transcoded at different bit rates or different content types. One or more user-specific content segment groupings may be associated with the unique portion of the recording for the computing device 110. A common portion of the content may be stored for each of the computing devices. The user-specific storage may comprise information (e.g., index files) to allow for the location and reconstitution of the content based on the user-specific portion, the common portion, the header data, and/or the like.

A manifest may indicate the offsets to the user-specific content segments within each user-specific content segment group. The manifest may be generated by the packager 106 or the content recording system 170. Alternatively, a master index file may indicate the offsets to the user-specific content segments within each user-specific content segment group. The common segments may be stored separately and the relationship with user-specific content segments may be reflected in the manifest, the master index file, or the metadata store.

Storing the user-specific content segments together on disk (e.g., grouping the content segments based on anticipated duration of playback of those segments and/or the likelihood of a particular bit rate version of content being requested by the computing device 110) may result in reduced storage fragmentation enabling more efficient deletion by avoiding the issuance of unnecessary seeks for deletes. Further, the writes, reads, and deletes workloads are more efficient because of the sequential IO and reduction in overall I/O operations per second (IOPS) in the storage 172. For example, the user-specific content segments that were encoded/transcoded at the highest bit rate may be concatenated in a single cloud storage container. The single storage location may comprise a SATA drive, an SSD, or an NVMe drive. For example, user-specific content segments that were encoded/transcoded at lower bit rates may be stored in a plurality of storage locations. For example, these lower bit rate representations may be stored among one or more SATA drives, one or more SSDs, or one or more NVMe drives. Grouping the content segments based on anticipated duration of playback of those segments and/or the likelihood of a particular bit rate version of content being requested by the computing device 110 may result in an improved efficiency for the caching of the playback of stored segments in anticipation of a bit rate ladder ramp up (e.g., ramping up from a low bit rate version to a higher bit rate version).

As described above, the user-specific content segment groupings may be based on bit rate. Because user-specific content segments for low bit rate (LBR) versions of content or medium bit rate (MBR) versions of content are smaller in size and consume less RAM cache, they may be stored in multiple user-specific content segment groups. High bit rate (HBR) versions of content may be stored in a single user-specific content segment group in anticipation of more frequent playback and therefore more efficient caching in memory. Further, the HBR content may be stored on faster hardware while the lower representations (LBR and MBR) may be stored on less resilient or slower hardware due to their less frequent usage. For example, by writing the multiple HBR versions of content in a single user-specific content segment group, the disk is required to seek a write location only once. In contrast, non-sequential write operations would involve multiple seek operations and, thus, take longer to perform.

Figure 2:
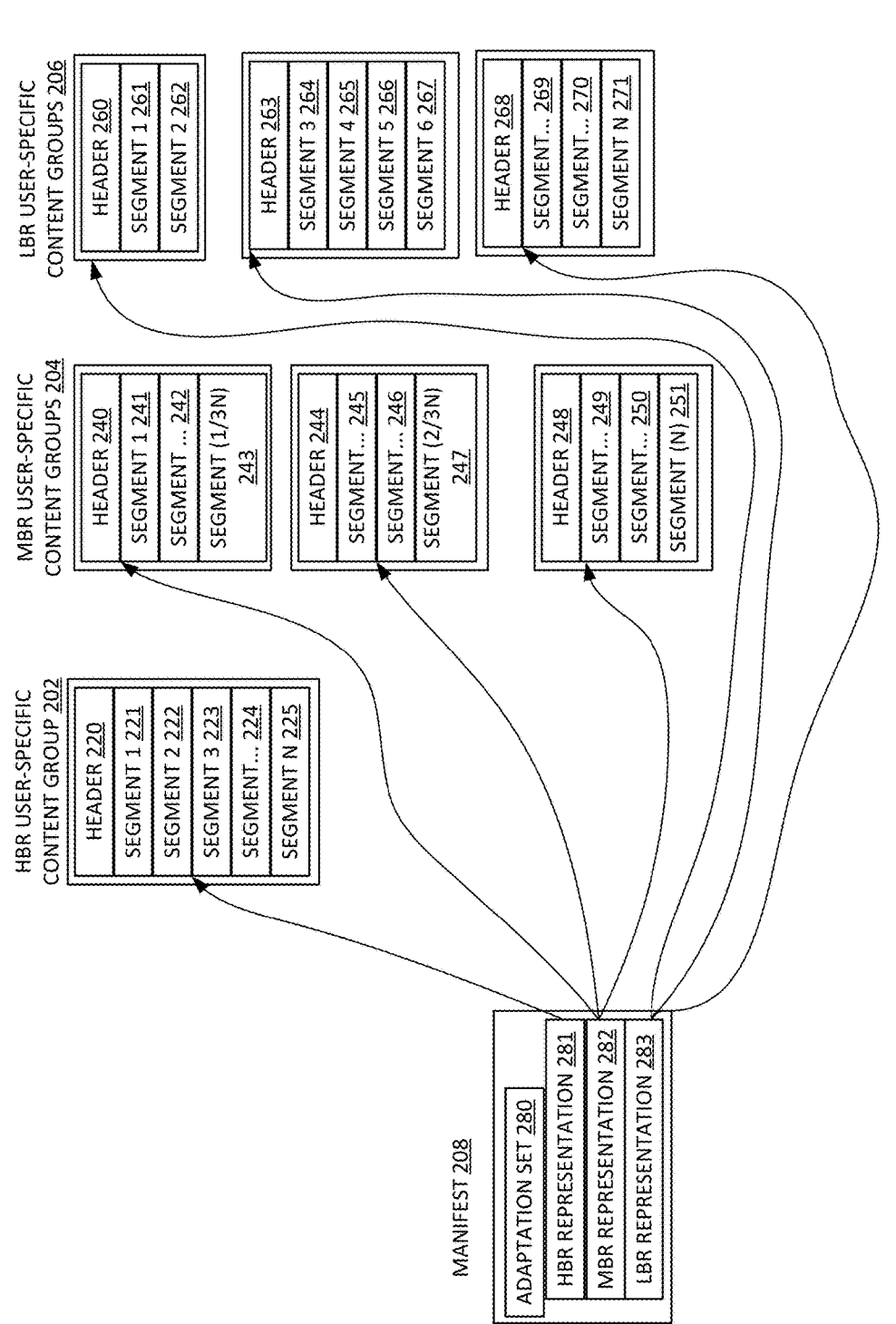
FIG. 2 shows example storage groupings.

FIG. 2 shows an example of user-specific content segment groups 200. FIG. 2 shows groupings of content based on bit rate: an HBR user-specific content segment group 202, a plurality of MBR user-specific content segment groups 204, and a plurality of LBR user-specific content segment groups 206. Each user-specific content segment of the concatenated user-specific content segments shown in the HBR user-specific content segment group 202, the plurality of MBR user-specific content segment groups 204, and the plurality of LBR user-specific content segment groups 206 may be associated with content encoded/transcoded at different bit rates or different content types As described above, because user-specific content segments for LBR versions of content or MBR versions of content are smaller in size and consume less RAM cache, they may be stored in multiple user-specific content segment groups (e.g., the plurality of MBR user-specific content segment groups 204 and the plurality of LBR user-specific content segment groups 206). In contrast, the HBR versions of content may be stored in a single user-specific content segment group (e.g., the HBR user-specific content segment group 202) in anticipation of more frequent playback and therefore more efficient caching in memory.

Each user-specific content segment of the concatenated user-specific content segments shown in the HBR user-specific content segment group 202, the plurality of MBR user-specific content segment groups 204, and the plurality of LBR user-specific content segment groups 206 may be associated with a user profile. For example, the user-specific content segment groups (the HBR user-specific content segment group 202, the plurality of MBR user-specific content segment groups 204, and the plurality of LBR user-specific content segment groups 206) may be stored (e.g., in storage 172 of FIG. 1) using a path structure indicative of a user profile. For example, the path structure may indicate the location for a unique recording of a program for a user. For example, the path structure may be indicated as /<recording_id>/<period_id>/<adaptation-_set_id>/profile<profile_id>/<start_time>.ucg).

A manifest 208 may indicate the location of the unique recording of the program for the user and the offsets to the user-specific content segments within each user-specific content segment group (e.g., the offsets within the HBR user-specific content segment group 202, the plurality of MBR user-specific content segment groups 204, and the plurality of LBR user-specific content segment groups 206). The manifest 208 may comprise an adaptation set 280 indicating the location of the HBR representation 281, MBR representation 282, and LBR representation 283. As described above, the HBR user-specific content segment 202, the plurality of MBR user-specific content segment groups 204, and the plurality of LBR user-specific content segment groups 206 may represent a unique recording, which comprises portions (e.g., user-specific content segments) encoded/transcoded at different bit rates. The common segments may be stored separately and the relationship with user-specific content segments may be reflected in the manifest 208.

The user-specific content segment groupings may be based on bit rate. The HBR user-specific content segment group 202 may be stored in a single user-specific content segment group (e.g., single storage container) in anticipation of more frequent playback and therefore result in more efficient caching in memory. The lower representations (the plurality of MBR user-specific content segment groups 204 and the plurality of LBR user-specific content segment groups 206) may be stored on less resilient or slower hardware due to their less frequent usage.

For example, a user may request playback of a program that the user recorded. A computing device used for playback (e.g., the computing device 110 of FIG. 1) may request portions of recorded content for playback (e.g., HBR representation 281, MBR representation 282, and LBR representation 283) based on information in the manifest 208. As playback begins, the computing device may, for example, request portions of the content at lower bit rates for a brief period as network conditions stabilize. For example, the computing device may request user-specific content segments from the plurality of LBR user-specific content segment groups 206 as indicated in the manifest 208. The manifest may indicate the location for the LBR representation 283. The location may indicate the headers 260, 263, and 268 identifying each of the plurality of LBR user-specific content segment groups 206 and the offsets between each user-specific content segment 261, 262, 264, 265, 266, 267, 269, 270, and 271. The computing device may request and play back each of the LBR user-specific content segments 261, 262, 264, 265, 266, 267, 269, 270, and 271 and the associated common content until the computing device has determined that network conditions support playback of higher bit rates and therefore move one or more steps up a bit rate ladder.

The computing device may, for example, request portions of the content at the next group of bit rates (e.g., the plurality of MBR user-specific content segment groups 204). The manifest may indicate the location for the MBR representation 282. The location may indicate the headers 240, 244, and 248 identifying each of the plurality of MBR user-specific content segment groups 204 and the offsets between each user-specific content segment 241, 242, 243, 245, 246, 247, 249, 250, and 251. The computing device may request and play back each of the MBR user-specific content segments 241, 242, 243, 245, 246, 247, 249, 250, and 251 and the associated common content until the computing device has determined that network conditions support playback of higher bit rates and therefore move one or more steps up a bit rate ladder.

The computing device may, for example, request portions of the content at the highest group of bit rates (e.g., the HBR user-specific content segment group 202). The manifest may indicate the location for the HBR representation 281. The location may indicate the header 220 identifying the HBR user-specific content segment group 202 and the offsets between each user-specific content segment 221, 222, 223, 224, and 225. The computing device may request and play back each of the HBR user-specific content segments 221, 222, 223, 224, and 225 and the associated common content. The HBR user-specific content segments 221, 222, 223, 224, and 225 are stored in a single user-specific content segment group in anticipation of more frequent playback by the computing device and therefore utilize a more layout. Further, the HBR user-specific content segments 221, 222, 223, 224, and 225 may be stored on faster hardware.

FIG. 3 shows an example method 300. The method 300 of FIG. 3 may be performed by any of the devices described herein. While each step in the method 300 of FIG. 3 is shown and described separately, multiple steps may be executed in a different order than what is shown, in parallel with each other, or concurrently with each other. At step 310, the system may receive a plurality of content segments transcoded at a plurality of bit rates, wherein the plurality of content segments may be associated with a user and with common content associated with a plurality of users. The common content is unplayable without the user-specific the plurality of content segments. For example, a unique recording may be associated with, for example, a recording requested by a computing device. The representation of the unique recording may comprise a portion (e.g., 1%) of the total recorded content and may be associated with a profile of the user associated with the computing device. The common content may comprise the remaining portion (e.g., 99%) and be common to multiple computing devices. The 99% common segments are unplayable without the user-specific content segments.

At step 320, the system may determine that content, transcoded at a bit rate satisfying a first threshold, is associated with a likelihood of being requested for playback above a second threshold, and will be played back for a duration longer than a third threshold. For example, the content may have been transcoded at a bit rate above the first threshold. For example, the likelihood of a content segment being requested may be higher for content transcoded at higher bit rates and may exceed the second threshold. For example, the first threshold may be based on one or more of: network bandwidth conditions, a channel change, or content time shifting. For example, if network bandwidth conditions are stable and sufficient bandwidth is available for high bit rate representations of content, the first threshold may be satisfied by bit rates that exceed the first threshold, which may also indicate that content transcoded at bit rates higher than the first threshold are the most likely to be requested, thereby exceeding the second threshold, and be played back for the longest duration thereby exceeding the third threshold.

At step 330, the system may store each content segment, of the plurality of content segments, satisfying the first threshold, the second threshold, and the third threshold, in a single storage location. For example, the content segments stored in the single location may have been transcoded at bit rates exceeding the first threshold. For example, these content segments may be the highest bit rate representations of the content. These content segments may be the most likely to be requested, exceeding the second threshold, and be played back for the longest duration exceeding the third threshold. For example, high bit rate representations of content segments may be most likely played back because network conditions are stable and sufficient for play back of the highest quality representations. Storing these content segments in a single location reduces storage fragmentation and enables more efficient write, read, and delete workloads because of the sequential IO and reduction in overall IOPS in the system. The single storage location may be associated with a single cloud storage container. The single storage location may comprise a SATA drive, an SSD, or an NVMe drive.

At step 340, the system may store each remaining content segment, of the plurality of content segments, in a plurality of storage locations. For example, the content segments stored in the plurality of storage locations may have been transcoded at bit rates below the first threshold. These content segments may be the least likely to be requested, below the second threshold, and be played back for the shortest duration below the third threshold. For example, these content segments may be least likely played back because network conditions are stable and sufficient for play back of the higher quality representations. These lower quality representations may only be played back for short durations in anticipation of bit rate ladder ramp up. The plurality of storage locations may be associated with a plurality of cloud storage containers. For example, these lower bit rate representations may be stored among one or more SATA drives, one or more SSDs, or one or more NVMe drives. In another example, the storing may be further based on the content type. For example, the content type may comprise advertising content. The advertising content may be stored in one of the plurality of storage locations because the advertising content is expected to be played back for only a short duration.

A manifest may indicate the storage location. Each storage location may be associated with a profile of the user and a header indicating each stored content segment, of the plurality of content segments, within that storage location. The manifest may be sent to a computing device associated with the user. The computing device may request content segments based on the information in the manifest. The system may retrieve from storage the requested content segment and the associated common content. The system may cause playback of the requested content segment and the associated common content.

FIG. 4 shows an example method 400. The method 400 of FIG. 4 may be performed by any of the devices described herein. While each step in the method 400 of FIG. 4 is shown and described separately, multiple steps may be executed in a different order than what is shown, in parallel with each other, or concurrently with each other. At step 410, the system may receive, from a computing device, a request for a content segment of a plurality of content segments. The plurality of content segments may be associated with a user and with common content associated with a plurality of users. The common content is unplayable without the user-specific the plurality of content segments. For example, a unique recording may be associated with, for example, a recording requested by the computing device. The representation of the unique recording may comprise a portion (e.g., 1%) of the total recorded content and may be associated with a profile of the user associated with the computing device. The common content may comprise the remaining portion (e.g., 99%) and be common to multiple computing devices. The 99% common segments are unplayable without the user-specific content segments.

At step 420, the system may determine, based on a bit rate at which the requested content segment was transcoded, whether the requested content segment is stored in a single storage location or a plurality of storage locations. For example, the content may have been transcoded at a bit rate above the first threshold. For example, the likelihood of a content segment being requested may be higher for content transcoded at higher bit rates and may exceed the second threshold. For example, the first threshold may be based on one or more of: network bandwidth conditions, a channel change, or content time shifting. For example, if network bandwidth conditions are stable and sufficient bandwidth is available for high bit rate representations of content, the first threshold may be satisfied by bit rates that exceed the first threshold, which may also indicate that content transcoded at bit rates higher than the first threshold are the most likely to be requested, thereby exceeding the second threshold, and be played back for the longest duration thereby exceeding the third threshold. For example, high bit rate representations of content segments may be most likely played back because network conditions are stable and sufficient for play back of the highest quality representations. Storing these content segments in a single location reduces storage fragmentation and enables more efficient write, read, and delete workloads because of the sequential IO and reduction in overall TOPS in the system. The single storage location may be associated with a single cloud storage container. The single storage location may comprise a SATA drive, an SSD, or an NVMe drive.

For example, the content segments stored in the plurality of storage locations may have been transcoded at bit rates below the first threshold. These content segments may be the least likely to be requested, below the second threshold, and be played back for the shortest duration below the third threshold. These lower quality representations may only be played back for short durations in anticipation of bit rate ladder ramp up. The plurality of storage locations may be associated with a plurality of cloud storage containers. For example, these lower bit rate representations may be stored among one or more SATA drives, one or more SSDs, or one or more NVMe drives. In another example, the storing may be further based on the content type. For example, the content type may comprise advertising content. The advertising content may be stored in one of the plurality of storage locations because the advertising content is expected to be played back for only a short duration.

At step 430, the system may cause playback of the requested content segment and common content associated with the requested content segment.

FIG. 5 shows an example method 500. The method 500 of FIG. 5 may be performed by any of the devices described herein. While each step in the method 500 of FIG. 5 is shown and described separately, multiple steps may be executed in a different order than what is shown, in parallel with each other, or concurrently with each other. At step 510, the system may determine that content transcoded at a bit rate exceeding a first threshold, is associated with a likelihood of being requested for playback above a second threshold, and will be played back for a duration longer than a third threshold. For example, the content may have been transcoded at a bit rate above the first threshold. For example, the likelihood of a content segment being requested may be higher for content transcoded at higher bit rates and may exceed the second threshold. For example, the first threshold may be based on one or more of: network bandwidth conditions, a channel change, or content time shifting. For example, if network bandwidth conditions are stable and sufficient bandwidth is available for high bit rate representations of content, the first threshold may be satisfied by bit rates that exceed the first threshold, which may also indicate that content transcoded at bit rates higher than the first threshold are the most likely to be requested, thereby exceeding the second threshold, and be played back for the longest duration thereby exceeding the third threshold.

At step 520, the system may store each content segment, of a plurality of content segments, satisfying the first threshold, the second threshold, and the third threshold, in a single storage location, wherein the plurality of content segments are associated with a user and with common content associated with a plurality of users. The common content is unplayable without the user-specific the plurality of content segments. For example, a unique recording may be associated with, for example, a recording requested by a computing device. The representation of the unique recording may comprise a portion (e.g., 1%) of the total recorded content and may be associated with a profile of the user associated with the computing device. The common content may comprise the remaining portion (e.g., 99%) and be common to multiple computing devices. The 99% common segments are unplayable without the user-specific content segments.

For example, the content segments stored in the single location may have been transcoded at bit rates exceeding the first threshold. For example, these content segments may be the highest bit rate representations of the content. These content segments may be the most likely to be requested, exceeding the second threshold, and be played back for the longest duration exceeding the third threshold. For example, high bit rate representations content segments may be most likely played back because network conditions are stable and sufficient for play back of the highest quality representations. Storing these content segments in a single location reduces storage fragmentation and enables more efficient write, read, and delete workloads because of the sequential IO and reduction in overall TOPS in the system. The single storage location may be associated with a single cloud storage container. The single storage location may comprise a SATA drive, an SSD, or an NVMe drive.

At step 530, the system may store remaining content segment, of the plurality of content segments, transcoded at a bit rate not satisfying the threshold, in a plurality of storage locations. For example, the content segments stored in the plurality of storage locations may have been transcoded at bit rates below the first threshold. These content segments may be the least likely to be requested, below the second threshold, and be played back for the shortest duration below the third threshold. For example, these content segments may be least likely played back because network conditions are stable and sufficient for play back of the higher quality representations. These lower quality representations may only be played back for short durations in anticipation of bit rate ladder ramp up. The plurality of storage locations may be associated with a plurality of cloud storage containers. For example, these lower bit rate representations may be stored among one or more SATA drives, one or more SSDs, or one or more NVMe drives. In another example, the storing may be further based on the content type. For example, the content type may comprise advertising content. The advertising content may be stored in one of the plurality of storage locations because the advertising content is expected to be played back for only a short duration.

Figure 6:
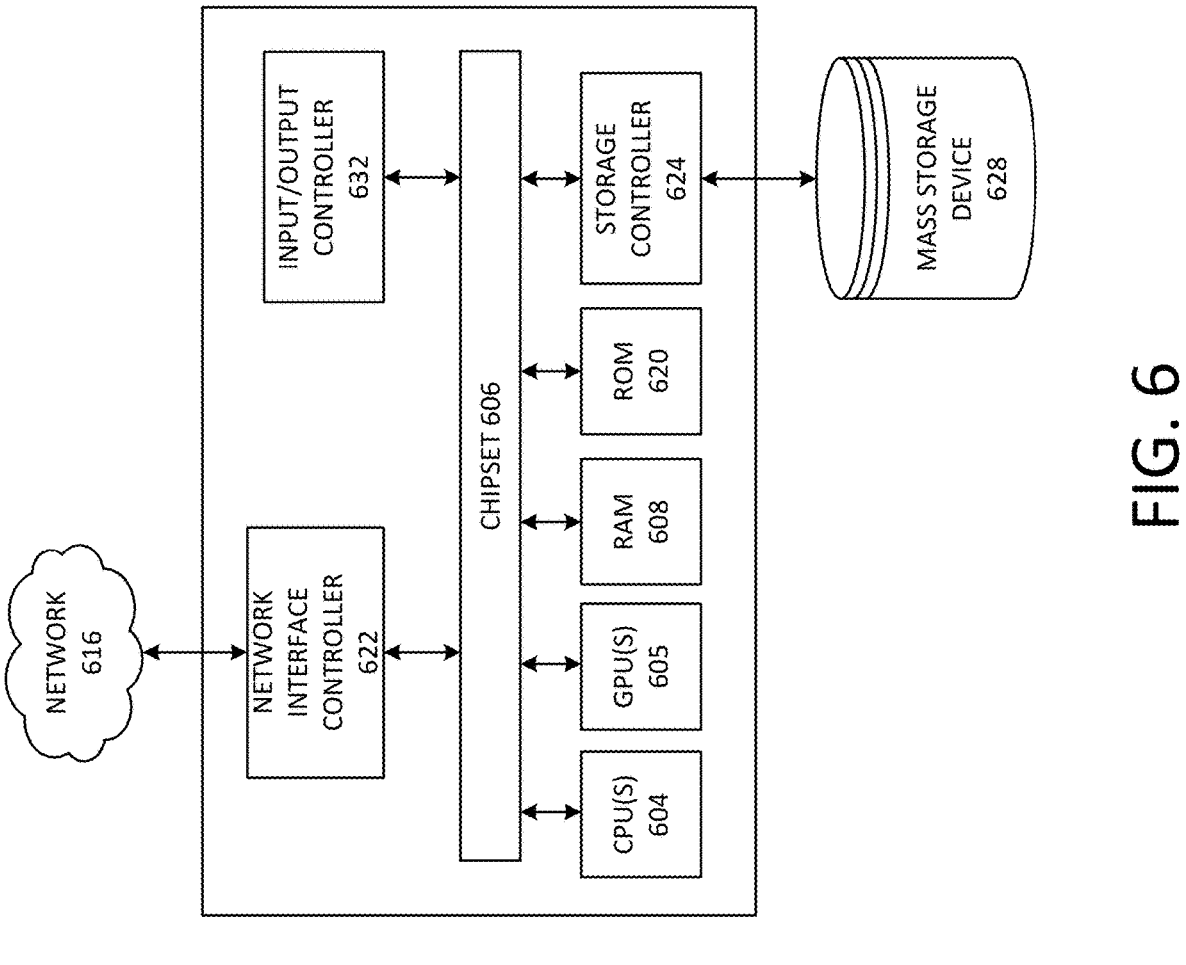
FIG. 6 depicts an example computing device.

FIG. 6 depicts a computing device 600 that may be used in various aspects, such as the servers, encoders, computing device, and other devices depicted in FIG. 1-2. With regard to the example architectures of FIGS. 1-2, the devices may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3-5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a SATA interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
   receiving a plurality of content segments transcoded at a plurality of bit rates, wherein the plurality of content segments are each associated with a respective user, and wherein the plurality of content segments are associated with common content associated with a plurality of users;
   determining that content is associated with a likelihood of being requested for playback above a first threshold; and
   storing each content segment, of the plurality of content segments satisfying the first threshold, in a single storage location.

2. The method of claim 1, further comprising:
   storing each remaining content segment, of the plurality of content segments, in a plurality of storage locations.

3. The method of claim 2, wherein each content segment stored in the single storage location is transcoded at a bit rate exceeding at a second threshold, and
   wherein each content segment stored in the plurality of storage locations were transcoded at a bit rate below the second threshold.

4. The method of claim 3, wherein the second threshold is based on one or more of: network bandwidth conditions, a channel change, or content time shifting.

5. The method of claim 2, wherein the plurality of storage locations are associated with a plurality of cloud storage containers comprising one or more serial advanced technology attachment (SATA) drives, one or more solid state drives (SSD), or one or more non-volatile memory express (NVMe) drives.

6. The method of claim 2, wherein the single storage location is associated with a first header and the plurality of storage locations are associated with a second header, wherein a manifest indicates whether each content segment of the plurality of content segments is stored under the first header or the second header.

7. The method of claim 1, wherein the single storage location is associated with a single cloud storage container comprising a serial advanced technology attachment (SATA) drive, a solid state drive (SSD), or a non-volatile memory express (NVMe) drive.

8. An apparatus comprising:
   one or more processors;
   memory; and
   instructions stored in the memory that, when executed by the one or more processors, cause the apparatus to:
      receive a plurality of content segments transcoded at a plurality of bit rates, wherein the plurality of content segments are each associated with a respective user, and wherein the plurality of content segments are associated with common content associated with a plurality of users;
      determine that content is associated with a likelihood of being requested for playback above a first threshold; and
      store each content segment, of the plurality of content segments satisfying the first threshold, in a single storage location.

9. The apparatus of claim 8, wherein the instructions, when executed by the one or more processors, further cause the apparatus to:
   store each remaining content segment, of the plurality of content segments, in a plurality of storage locations.

10. The apparatus of claim 9, wherein each content segment stored in the single storage location is transcoded at a bit rate exceeding at a second threshold, and
    wherein each content segment stored in the plurality of storage locations were transcoded at a bit rate below the second threshold.

11. The apparatus of claim 10, wherein the second threshold is based on one or more of: network bandwidth conditions, a channel change, or content time shifting.

12. The apparatus of claim 9, wherein the plurality of storage locations are associated with a plurality of cloud storage containers comprising one or more serial advanced technology attachment (SATA) drives, one or more solid state drives (SSD), or one or more nonvolatile memory express (NVMe) drives.

13. The apparatus of claim 9, wherein the single storage location is associated with a first header and the plurality of storage locations are associated with a second header, wherein a manifest indicates whether each content segment of the plurality of content segments is stored under the first header or the second header.

14. The apparatus of claim 8, wherein the single storage location is associated with a single cloud storage container comprising a serial advanced technology attachment (SATA) drive, a solid state drive (SSD), or a non-volatile memory express (NVMe) drive.

15. A non-transitory, computer-readable medium storing instructions that, when executed by one or more processors, cause:

receiving a plurality of content segments transcoded at a plurality of bit rates, wherein the plurality of content segments are each associated with a respective user, and wherein the plurality of content segments are associated with common content associated with a plurality of users;

determining that content is associated with a likelihood of being requested for playback above a first threshold; and storing each content segment, of the plurality of content segments satisfying the first threshold, in a single storage location.

16. The non-transitory, computer-readable medium of claim 15, wherein the instructions, when executed by the one or more processors, further cause:

storing each remaining content segment, of the plurality of content segments, in a plurality of storage locations.

17. The non-transitory, computer-readable medium of claim 16, wherein each content segment stored in the single storage location is transcoded at a bit rate exceeding at a second threshold, and wherein each content segment stored in the plurality of storage locations were transcoded at a bit rate below the second threshold.

18. The non-transitory, computer-readable medium of claim 17, wherein the second threshold is based on one or more of: network bandwidth conditions, a channel change, or content time shifting.

19. The non-transitory, computer-readable medium of claim 16, wherein the plurality of storage locations are associated with a plurality of cloud storage containers comprising one or more serial advanced technology attachment (SATA) drives, one or more solid state drives (SSD), or one or more non-volatile memory express (NVMe) drives.

20. The non-transitory, computer-readable medium of claim 15, wherein the single storage location is associated with a single cloud storage container comprising a serial advanced technology attachment (SATA) drive, a solid state drive (SSD), or a non-volatile memory express (NVMe) drive.

* * * * *